C. Polley,
Chain Pump.

Nº 9,466.   Patented Dec. 14, 1852.

UNITED STATES PATENT OFFICE.

CLARK POLLEY, OF MAYS LANDING, NEW JERSEY.

BUCKET FOR ENDLESS-CHAIN PUMPS.

Specification of Letters Patent No. 9,466, dated December 14, 1852.

*To all whom it may concern:*

Be it known that I, CLARK POLLEY, of Mays Landing, in the county of Atlantic and State of New Jersey, have invented a new and useful Adjustable Expanding Bucket for Endless-Chain Pumps, of which the following is a full, clear, and exact description, reference being had to the accompanying drawing, forming part of this specification, and in which—

Figure 1:
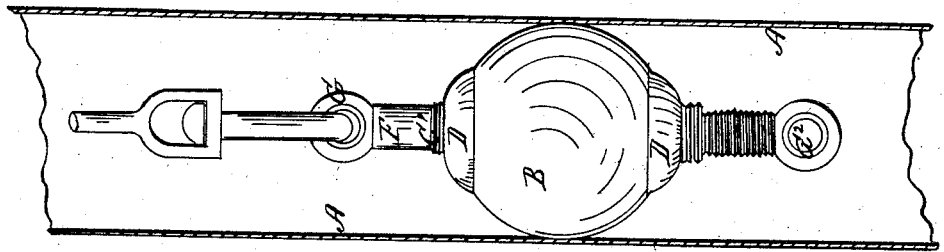
Figure 2:
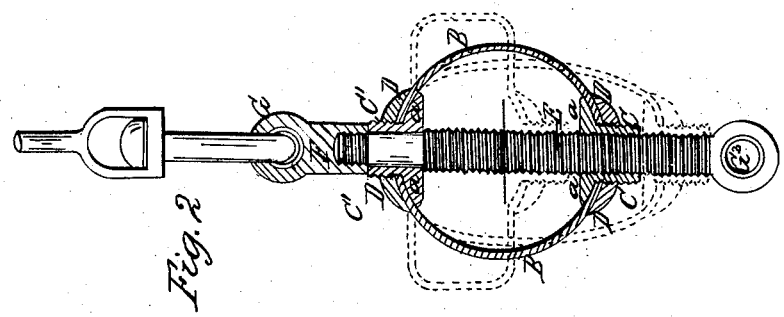

Figure 1 represents an elevation of a single spherical bucket having my improvements applied thereto, and also showing a section of a portion of the pipe within which it works. Fig. 2 represents a vertical central section of the same, the black lines showing the bucket adjusted to a spherical form, which is the medium diameter. The red lines show the bucket adjusted to its least diameter, when it is of a form approximating to an oblate spheroid, and the blue lines show the bucket adjusted to its greatest diameter, when its shape is nearly that of a prolate spheroid.

My invention relates to chain pumps having an endless series of buckets, and it consists in making the buckets of such a pump globular, and elastic, and adjustable to a greater or less diameter, as may be required, to make them fit the pump pipe, or to compensate for wear, by compressing or extending them, as the case may be, between collars on a stem or link rod which passes through them.

In the accompanying drawing A represents a section of a portion of the pump tube, within which the chain or endless series of buckets work, made of the usual form and materials.

B, is one of the buckets, made of india rubber or other suitable flexible material, in the form of a hollow sphere, perforated at its opposite poles. These polar holes are fitted with short tubes ($C$ $C^1$) having flanches ($a$) on their inner ends, and both of them screw threads cut on their outer periphery, and one of them on its inner periphery. The flanches of the tubes ($C$ $C^1$) are placed in the interior of the bucket, while their shanks protrude out far enough to receive nuts (D), between which and the flanches the edges of the india rubber surrounding the polar perforations is firmly clamped. A spindle or stem (E) passes through the polar tubes of the bucket. It has a pivot on one end and an eye ($G^2$) upon the other, while the shank between has a screw thread cut thereon which matches with an inverse screw in the tube (C), while the pivot on its opposite end fits the interior of the tube ($C^1$) and projects beyond the same far enough to admit of a screw thread being cut upon it to receive the nut formed in the inner end of the head piece (F), whose outer end has an eye (G) formed in it like the eye ($G^2$) on the opposite end of the spindle or stem (E). The neck formed between the shoulder of the pivot and the inner end of the head (F) forms the journal of a swivel joint for the spindle to turn on in the polar tube ($C^1$). Now since the pivoted end of the spindle turns on a swivel joint in one of the polar tubes ($C^1$) and its screw shank turns in a nut formed in the other polar tube (C) of the bucket, it is plain that by turning the spindle in one direction or the bucket itself in the opposite direction the pole of the bucket having the nut (C) secured in it will be moved toward the opposite pole having the swivel in it, thus increasing the diameter of the bucket, as shown by the blue lines in Fig. 2, and when the spindle or the bucket, as the case may be, is turned in the opposite direction the diameter of the bucket will be increased as represented by the red lines in Fig. 2. In this way the diameter of the bucket can be adjusted with the greatest nicety. It is only for convenience in removing the spindle or for clamping the bucket firmly in position on the spindle that the head (F) need be screwed to the end of the swivel pivot of the spindle, as it will work equally well except for clamping the bucket when riveted as when screwed to the pivot.

It is quite obvious that the adjustment of the diameter of the bucket by stretching and compressing it between collars on the spindle can be effected by various modifications of the devices I have described, or their equivalents, but it is unnecessary to describe them, as those I have already described will answer the purpose very well and are easily and cheaply made.

Each bucket with its screw spindle may form one link of the endless chain of the pump, each of these links being connected with the next or adjacent link by intermediate links or chains, as may be deemed expedient; and if it should be deemed advisable a swivel may be placed between every two of the buckets.

What I claim as my invention and desire to secure by Letters Patent, is—

The globular, elastic, and adjustable bucket for chain pumps constructed substantially in the manner and for the purpose herein set forth.

In testimony whereof I have hereunto subscribed my name.

CLARK POLLEY.

Witnesses:
C. P. ABLOTT,
E. S. TAYLOR.